UNITED STATES PATENT OFFICE.

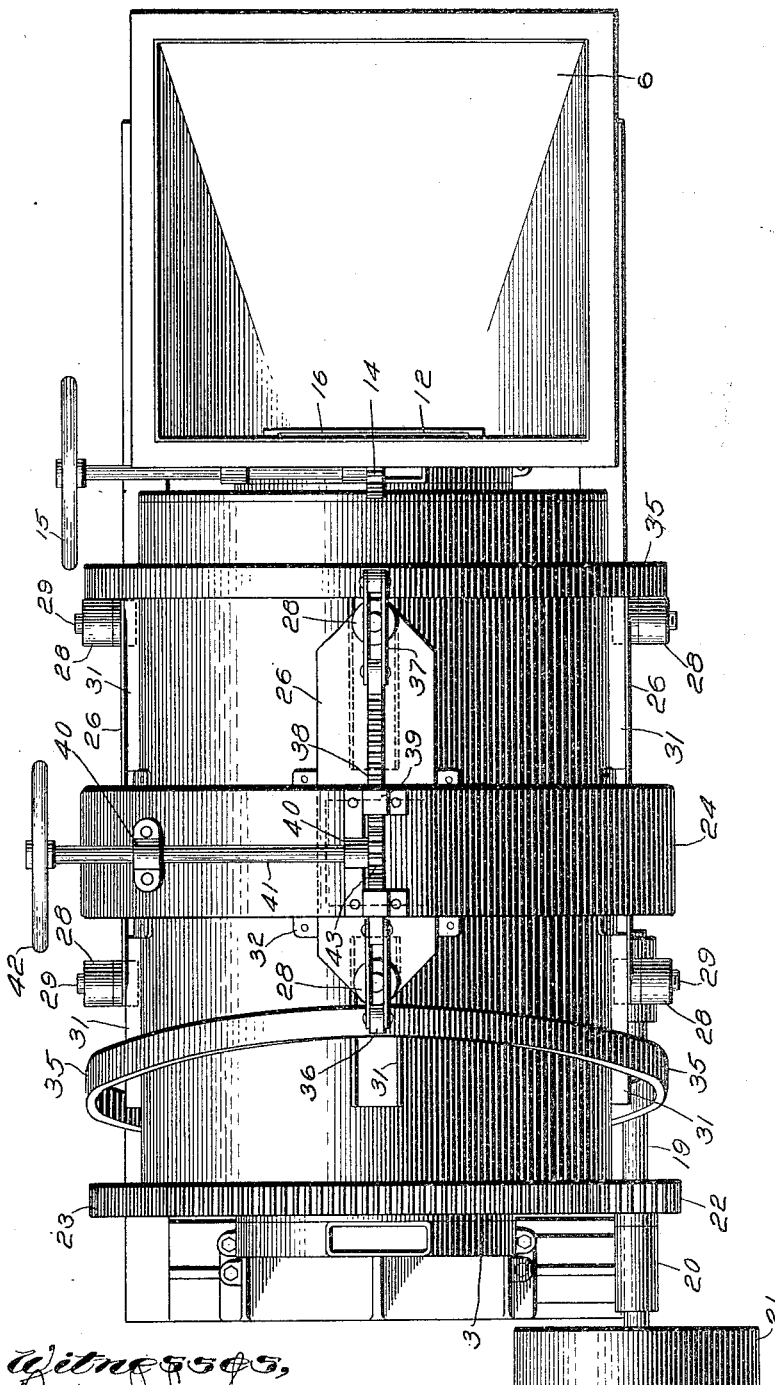

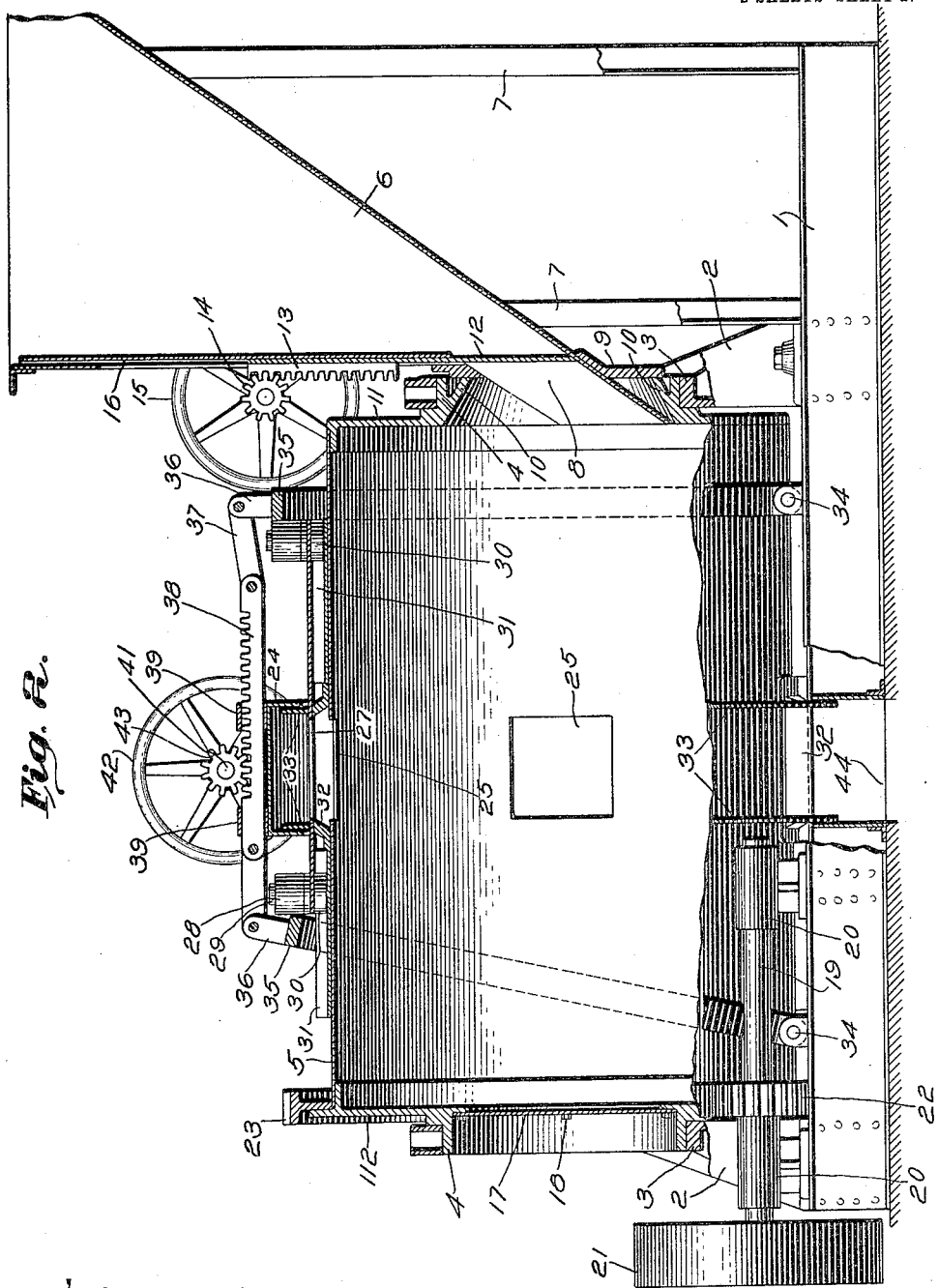

ROBERT D. SOARS, OF BUFFALO, NEW YORK, ASSIGNOR TO HUNSO MACHINERY COMPANY, OF BUFFALO, NEW YORK, A CORPORATION OF NEW YORK.

MIXING-MACHINE FOR FERTILIZERS.

1,123,943.

Specification of Letters Patent.

Patented Jan. 5, 1915.

Application filed February 25, 1914. Serial No. 821,013.

*To all whom it may concern:*

Be it known that I, ROBERT DRYSDALE SOARS, a citizen of the United States, residing at Buffalo, county of Erie, and State of New York, have invented an Improvement in Mixing-Machines for Fertilizers, of which the following description, in connection with the accompanying drawings, is a specification, like letters on the drawings representing like parts.

The invention to be hereinafter described relates to mixing machines and more particularly to machines for mixing fertilizers.

In machines of the general type to which the present invention refers, a mixing drum is mounted for rotative movement and may contain suitable stirrers or mixing blades, so that upon rotation of the drum the materials become thoroughly blended and mixed together. Such machines, as pointed out in the patent of Robert D. Soars, No. 985,299, dated February 28, 1911, have a shell or casing surrounding the drum or a part thereof which provides a space between the drum and shell for the reception of material mixed by the drum, and in said patent the drum was provided with a peripheral opening through which the material in the drum might pass uninterruptedly to the said space. In said patent also, the drum was sustained upon rolls working on tracks arranged about the exterior of the drum.

While the machine of said patent has been found practically efficient, the present invention aims to provide certain important features for controlling the discharge of material from the drum and in certain improved supporting and operating devices, all as will best be made clear from the following description and accompanying drawing of one form of means for carrying the invention into practical effect, it being understood that the invention is not limited to the particular means shown and described, but in its true scope it is definitely set forth by the claims.

In the drawings:—Figure 1 is a plan view of one form of mixing machine having the present invention embodied therein; and Fig. 2 is a sectional side elevation thereof with some of the parts broken away.

The form and general character of the mixing drum and the mixing blades therein may be of any suitable or desired character, or as pointed out by said patent to Soars, but in the drawings said drum is shown as substantially cylindrical and as being of a form well adapted to certain features of the present invention, as will presently appear.

Rising from a suitable supporting base 1 which may consist of iron girders or the like, if desired, are the drum supports 2, 2. Each of these supports is provided with an enlarged circular bearing 3, Fig. 2, for receiving the projecting portions 4 extending from the ends of the drum, the construction being such that the drum 5 may be rotatably supported at its end portions by the bearings afforded between the parts 3 and 4, as described.

Sustained adjacent one end of the drum 5 is the hopper 6 which may be supported upon uprights 7 resting upon the machine bed.

The hopper 6 has a discharge end portion 8 extending into the open end of the drum 5 within the bearing portions 3, 4, and in order to properly close the feed end of the drum a hood 9 is secured upon the lower portion of the hopper and bears by its face upon the conically-extending end portions 10 projecting from the end 11 of the drum, the construction being such that material placed within the hopper 6 may find its way readily to the interior of the drum without interfering with its rotative capacity.

A door 12 is provided for controlling the discharge opening of the hopper 6 into the drum, and as one form of means to this end the upper portion of the door 12 is provided with a rack 13 which is engaged by a pinion 14 operated by a hand-wheel 15, so that upon turning the hand-wheel 15 the door 12 may be raised or lowered in its guides 16 to open or close the discharge end of the hopper 6.

The opposite end 112 of the drum has a detachable door 17 which may be secured in place by appropriate means such as the bolts 18, while the machine is in operation, the construction being such that upon removing the door 17, the interior of the drum may be rendered accessible for cleaning, or other purposes.

Mounted on a driving shaft 19, which is sustained in suitable bearings 20, preferably rising from the machine bed, is a driving pulley 21 which may derive power through suitable belting from any desired source.

Secured to the shaft 19 is a pinion 22 meshing with a large master gear or pinion 23 secured to the end portion of the drum, substantially as indicated in Fig. 2.

From the construction described, it will be noted that the weight of the drum and its contents is sustained upon its bearings 3, 4, at the ends thereof, and that its rotative movement is derived from the driving shaft 19 through the driving connections or their equivalent. This manner of supporting and driving the drum has been found efficient and practical, but so far as certain features of the invention are concerned, as will hereinafter appear, these features may be otherwise constructed and arranged.

As pointed out in the patent to Soars, hereinbefore referred-to, the material after being mixed in the mixing drum, is discharged into a space between the drum and a shell or casing surrounding a portion of the drum, said shell or casing being preferably stationary. In the patent to Soars it will be noted that the communication between the interior of the drum and shell or casing was always open and the material mixed in the drum was free to pass into the space between the drum and shell.

The present invention contemplates an interrupted communication between the drum and shell and to this end provides a door for the opening and closing of said communication.

In the particular form of the invention shown, the casing 24 surrounds the drum in a zone between end portions of the drum, and between this casing and the cylindrical wall of the drum a door is provided for opening and closing the communication between the drum and casing through the opening 25 made in the peripheral wall of the drum.

There may be a series of doors disposed between the casing and drum corresponding to a series of openings 25 in the peripheral wall of the drum, but since all of said doors may be of the same character and the operating means for opening and closing them is the same, a description of one will suffice for all; indeed, one door might be used instead of a plurality, if desired.

The door 26 is preferably formed as a plate having an open portion 27 which, when in register with the opening 25 in the drum establishes communication between the drum and the shell 24, and when the solid portion of the door is in register with the opening 25 such communication is interrupted.

The door 26 preferably extends in a longitudinal direction on the exterior wall of the drum and is provided at each end with a roller 28 supported by a pin 29 secured to the end portion of the door. Below the door 26 the pins 29 are preferably provided with the rollers 30 adapted to move in the guideways 31 secured to the exterior wall of the drum. It will be noted that the door 26 extends between the drum and the shell or casing 24, and may be held from radial movement with relation to the drum by any suitable means. In the present form of the invention the drum has secured upon its exterior surface a door plate 32 which serves as a bearing for the door, but while this is found to be a good, practical door support, it may not be necessary in some cases. Extending circumferentially about the drum are the webs 33, said webs being provided with openings therein of sufficient dimensions to permit the door to move without binding, but on each side thereof these flanges continue about the drum, and extend into the shell 24 to close any opening that might otherwise exist between the shell and drum.

While the above construction presents a good, practical form of the door construction and its mounting, it is to be understood that the invention is not limited thereto, but that various expedients for mounting the door in its operative relation to the drum and between it and the casing 24 will at once suggest themselves to those skilled in the art.

Pivoted at 34, Fig. 2, are the door controllers 35 which extend upward and about the drum substantially as indicated in the drawing, and at their upper portions are provided with the lugs 36 by which they are connected to links 37 which are themselves pivotally united to a rack 38. The rack 38 which offers one convenient form of means for moving the door controllers about their pivots 34, is mounted to slide in suitable bearings 39 projecting from the shell 24.

Mounted in suitable bearings 40 conveniently secured to the shell 24, is a shaft 41 having a hand-wheel 42 at one end and a pinion 43 which is in engagement with the rack 38, the construction being such that upon rotation of the hand-wheel 42 which is under control of the operator, the rack 38 and perforce the door controllers 35 may be moved about their pivots 34, into the position indicated by Fig. 2 or into the reverse position, as will be readily understood.

The door controllers 35 are preferably formed in substantially hoop-shape, and encircle the drum for engagement with the rollers 28 whereby the door will be mounted longitudinally of the drum either to open or close communication with the shell 24, according to the position of the door controllers.

When the door controllers are in the position indicated in Fig. 2, for instance, the door 26 will open communication between the drum and the shell 24; but if, as the drum rotates, the controllers are moved to the left, Fig. 2, by means of the hand-wheel 42 and the described connections with the rack 38, the roller 28 at the right end of the door will engage the door controllers which will then be in inclined position to the left, and as it moves along the surface of the door controllers 35, the roller 28 will move the door longitudinally to the left, thereby bringing the solid portion of the door over the passageway or opening 25, and closing communication between the drum and shell.

From the construction described it will be noted that the door 26 for controlling the communication between the drum and the casing, will be automatically moved as the drum rotates to open or close such communication according to the position of the door controllers 35, and that the position of said controllers is changeable at the will of the operator; and I believe that I am the first in the art of mixing machines to provide a door operable automatically as the drum rotates, for opening and closing communication between the drum and the exterior casing.

The construction hereinbefore described constitutes a good, practical form of the invention, but it is to be understood that the invention is not limited to the particulars described, but that it is inclusive of various forms of doors and automatic operating means therefor; and while the present invention has been described in connection with a plurality of doors, it is to be understood that the number of doors may be varied to suit the conditions of use.

In order that the material delivered from the drum to the shell 24 when the doors are open shall be appropriately discharged therefrom, the lower portion of the shell 24 may be provided with an opening 44 which leads into a chute or other form of conveyer, see Fig. 2. This opening at 44 may be permanent, or, if desired, it may be closed, substantially as suggested in the Soars patent heretofore referred-to, and opened at desired times.

What is claimed is:—

1. In a fertilizer mixing machine, the combination of a mixing drum, a shell surrounding a portion of said drum, a door between the drum and shell and extending through the wall of the shell for controlling communication between the drum and shell, and means constructed and arranged to be positioned at will for moving said door as the drum rotates to open or close the communication between the drum and shell.

2. In a fertilizer mixing machine, the combination of a mixing drum, a shell surrounding a portion of said drum, a door extending through the wall of the shell for controlling communication between the drum and shell, and door controlling means exterior of the shell and adjustable into position to act upon and open or close the door due to rotative movement of the drum.

3. In a fertilizer mixing machine, the combination of a mixing drum, a casing surrounding said drum and providing a space between the drum and shell, a door carried by the drum for controlling communication between the drum and casing, and provided with a part extending outside the drum and casing, means for rotating the drum, and means adapted to operate upon the part of the door outside the drum and casing as the drum is rotated to open or close communication between the drum and shell.

4. In a machine for mixing fertilizers, the combination of a mixing drum, a shell disposed in a zone extending about the drum and providing a space between the drum and shell for receiving material, said drum having a peripheral discharge opening leading into the space between the shell and drum, a door for said discharge opening and door controlling means movable into position outside the drum and shell to engage a part connected to the door and acting upon rotation of the drum for opening or closing said door.

5. In a machine for mixing fertilizers, the combination of a mixing drum, a shell surrounding a portion of said drum, means for relatively rotating said drum and shell, a door carried by the drum and extending through the shell between the drum and shell, and means for moving said door to open or close communication between the drum and shell as they are relatively rotated.

6. In a machine for mixing fertilizers, the combination of a mixing drum, means for rotating said drum, a shell surrounding a portion of said drum and providing a space between the drum and shell for material, a door for controlling communication between the drum and shell, and door controlling means for positively moving the door to open and to closed position, said means being movable to cause the door to be thus positively moved due to rotative movement of the drum and shell.

7. In a fertilizer mixing machine, the combination of a mixing drum, a shell surrounding a zone of said drum, a door for controlling communication between the drum and shell, two door controllers for opening and closing said door as the drum is rotated, and means operable at will for moving one door controller into and the other out of operative position.

8. In a fertilizer mixing machine, the combination of a mixing drum, a shell surrounding a zone of said drum between the end portions thereof and providing a space between the drum and shell to receive material from the drum, said shell having a discharge opening, a door carried by the drum for controlling communication between the drum and shell, door controllers operating automatically upon rotation of the drum for moving said door to either its open or closed position and means for moving said controllers into position for either opening or closing the door as the drum is rotated.

9. In a fertilizer mixing machine, the combination of a mixing drum, a shell surrounding a zone of said drum between the end portions thereof and providing a space between the drum and shell to receive material from the drum, said shell having a discharge opening, a door carried by the drum and extending through the shell for controlling communication between the drum and shell, and door controllers operating automatically upon rotation of the drum for moving said door.

10. In a fertilizer mixing machine, the combination of a mixing drum, a shell surrounding said drum, a sliding door carried by the drum and extending through a wall of the shell for controlling communication between the drum and shell, and means acting on the sliding door to move the same as the drum is rotated.

11. In a fertilizer mixing machine, the combination of a mixing drum, a shell surrounding the drum and providing a space for material outside the drum, a door for controlling communication between the drum and shell, door controllers, one for opening and the other for closing the door, connections for causing the controllers to move the one into and the other out of operative position, and means under control of the operator for positioning the controllers.

12. In a fertilizer mixing machine, the combination of a mixing drum, a shell surrounding a portion of said drum and forming a space for the reception of material from the drum, a door between the shell and drum, guides for directing the movement of the door, and door controlling means movable into position to cause the door to be moved in its guides due to rotative movement of the drum for opening and closing communication between the drum and shell.

13. In a fertilizer mixing machine, the combination of a drum, a shell surrounding a zone of said drum, a door carried by the drum and extending through a wall of the shell, a web between the drum and shell to prevent escape of material from the shell to the outside thereof as the drum rotates, and door controlling means for opening or closing the door as the drum rotates.

14. In a fertilizer mixing machine, a drum having a discharge opening, a shell surrounding the drum, a door having a solid and an open portion, means for guiding the door as its solid or open portions are moved into register with said discharge opening in the drum, and door controlling means movable into position to cause the door to be moved with respect to its guiding means due to rotation of the drum to place the solid or open portions of the door opposite the opening in the drum.

15. In a fertilizer mixing machine, the combination of a drum, a shell surrounding the drum, a sliding door carried by the drum, door controlling means outside the drum and shell movable into position to cause the door to be moved due to rotation of the drum, and means connected to the door and engaging the door controlling means as the drum is rotated to positively slide the door on the drum.

In testimony whereof, I have signed my name to this specification, in the presence of two subscribing witnesses.

ROBERT D. SOARS.

Witnesses:
F. L. SCOTT,
M. F. LANSILL.

Copies of this patent may be obtained for five cents each, by addressing the "Commissioner of Patents, Washington, D. C."